United States Patent [19]
Kuwana

[11] 3,941,429
[45] Mar. 2, 1976

[54] BRAKE CONTROL SYSTEM FOR VEHICLES
[75] Inventor: Kazutaka Kuwana, Toyota, Japan
[73] Assignee: Aisin Seiki Kabushiki Kaisha, Kariya, Japan
[22] Filed: Dec. 13, 1974
[21] Appl. No.: 532,644

[30] Foreign Application Priority Data
Dec. 21, 1973 Japan.................................. 49-1395

[52] U.S. Cl. ............................ 303/21 F; 188/181 A
[51] Int. Cl.² ............................................ B60T 8/08
[58] Field of Search .................... 188/181 A, 181 C; 303/21 BE, 21 F

[56] References Cited
UNITED STATES PATENTS
3,524,683  8/1970  Stelzer............................... 303/21 F

*Primary Examiner*—Duane A. Reger
*Attorney, Agent, or Firm*—Finnegan, Henderson, Farabow & Garrett

[57] ABSTRACT

Brake control system for vehicles which comprises at least one brake pressure control valve for providing a brake pressure corresponding to brake actuating force applied to a brake actuating pedal or the like. The valve is characterized by the fact that means is incorporated therein for controlling the brake pressure in accordance with electrical signal representing actual deceleration rate of associated wheel. The brake control system is further characterized by the fact that the brake mechanisms for the front wheels can be operated by a hydraulic system which is independent of that for the brake mechanisms for the rear wheels.

5 Claims, 4 Drawing Figures

BRAKE CONTROL SYSTEM FOR VEHICLES

The present invention relates to brake means for motor vehicles and more particularly to brake means of such a type in which brake hydraulic pressure can be controlled in response to an actuating force applied to brake actuating means. More specifically, the present invention relates to brake pressure control means by which brake hydraulic pressure can be controlled in response to a further signal as well as in response to an actuating force applied to brake actuating means.

Conventional brake pressure control means utilized for the purpose comprises independent portions, one for establishing brake hydraulic pressure which varies in response to the actuating force applied to the brake actuating means, and the other for controlling the brake hydraulic pressure in response to an electrical signal. Such an electrical signal may be the one generated by wheel skid detecting means employed in an anti-skid brake system.

The present invention has an object to provide brake pressure control means which is simple in construction and in which the aforementioned two portions are incorporated in one unit.

Another object of the present invention is to provide vehicle brake means in which brakes for left front wheel, right front wheel and rear wheels can be independently controlled.

According to the present invention, the above and other objects can be accomplished by a brake pressure control valve comprising a valve housing which has an axial bore provided with an inlet port adapted to be connected with a hydraulic pressure source, an outlet port adapted to be connected with a brake actuating device and a return port adapted to be connected with a fluid reservoir, a valve spool slidably disposed in the axial bore of the valve housing, said valve spool having first land means defining within said valve housing a first control chamber at one side of the land means and a second control chamber at the other side, means provided in said spool for connecting the inlet port with the outlet port when the spool is slidably displaced toward a first direction in said axial bore of the housing, means provided in said spool for connecting the outlet port with the return port when the spool is slidably displaced toward a second direction in said axial bore of the housing, said outlet port being so disposed that pressure therein serves to bias the spool toward said second direction, said first and second control chamber being so disposed that pressure in the first chamber serves to bias the spool toward said second direction while the pressure in the second chamber serves to bias the spool toward said first direction, said first and second control chambers being connected respectively through a first and a second restricted passages with the hydraulic pressure source and the reservoir so that restricted passages are established from the hydraulic pressure source through the first and second control chambers to the reservoir, at least one of said first and second passages being provided with a nozzle controlled by solenoid valve means. In a preferable arrangement, the first and second passages are provided with first and second nozzles, respectively, which are controlled by first and second solenoid valve means. The first and second solenoid valve means are controlled by electrical signals representing rate of deceleration of associated wheel so that, when the deceleration rate is below a predetermined value, the first solenoid valve means is opened to increase the pressure in the first control chamber and, when the deceleration rate is higher than the predetermined value, the second solenoid valve means is opened to increase the pressure in the second control chamber.

According to further aspect of the present invention, three brake pressure control valves of the aforementioned type are provided, two of them being for two front wheels and the remaining one for rear wheels.

The above and other objects and features of the present invention will become apparent from the following descriptions of preferred embodiments taking reference to the accompanying drawings, in which.

Figure 1:
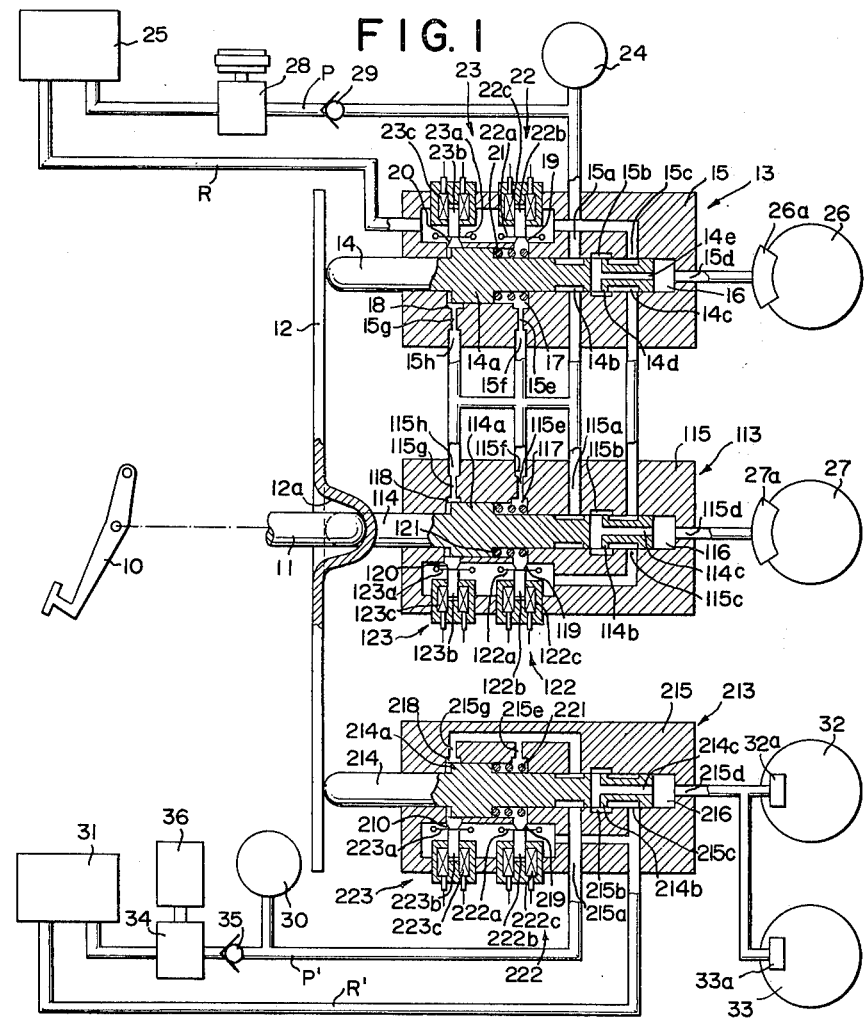
FIG. 1 is a schematic diagram of the brake control system embodying the features of the present invention, in which brake control valves are shown by sectional views.

Referring now to the drawings, particularly to FIG. 1, there is shown a vehicle brake control system which includes three substantially identical brake control valves 13, 113 and 213. The first brake control valve 13 comprises a valve housing 15 having an axial bore in which a valve spool 14 is axially slidably received. The valve spool 14 has a left end extending leftwardly beyond the valve housing and a right end terminating in the axial bore of the valve housing to define an output chamber 16 at the right hand end of the bore. The axial bore of the valve housing 15 is enlarged at the left hand portion thereof and the valve spool 14 has a land 14a disposed in the enlarged portion of the bore to define a first control chamber 17 at right side thereof and a second control chamber 18 at left side thereof.

The valve housing 15 is formed with an inlet port 15a opening to the axial bore of the housing and connected through a check valve 29 with a hydraulic pump 28 which draws hydraulic fluid from a fluid reservoir 25 and supplied pressurized hydraulic fluid to the port 15a through a pressure line P. The pressure line P is provided with a pressure accumulator 24 as well known in the art. The valve housing 15 is also provided at the axial bore thereof with a return port 15c axially spaced apart from the inlet port 15a, and an annular groove 15b is disposed between the ports 15a and 15c. The return port 15c is connected through a return line R with the reservoir 25. The valve spool 14 is formed with two axially spaced apart annular grooves 14b and 14c and a land 14d between the annular grooves 14b and 14c. The grooves 14b and 14c are respectively in communication with the inlet and the return ports 15a and 15c. The valve spool 14 is further provided with a flow passage 14e which opens on one hand to the outlet chamber 16 and on the other hand to the periphery of the land 14d so as to communicate with the annular groove 15b. Thus, it will be seen that, when the spool 14 is in a normal position, the outlet chamber 16 is connected through the passage 14e and the annular grooves 15b, and 14c with the return port 15c but, when the spool 14 is displaced toward right, the outlet chamber 16 is connected with the inlet port 15a.

The first and second control chambers 17 and 18 are connected with the pressure supply line P through passages 15f and 15h respectively provided with restrictions 15e and 15g. The first and second control chambers 17 and 18 are also opened to the return line through flow restriction nozzles 19 and 20, respectively, which are respectively controlled by solenoid valve means 22 and 23. The solenoid valve means 22 comprises a valve member 22a made of a leaf spring member and co-operating with the nozzle 19. A plunger 22b constituting a solenoid core is secured to the valve member 22a and solenoid coil 22c is disposed around the core 22b. Thus, when the solenoid is energized by supplying electric current through the solenoid coil 22c, the plunger 22b is retracted upwardly to open the nozzle 19. The opening of the nozzle can be determined by the amount of current supplied to the coil 22c. The solenoid valve means 23 is constructed the same as the solenoid valve means 22 and comprises a valve member 23a, a plunger 23b and a solenoid coil 23c. The valve spool 14 is biased toward left by a coil spring 21.

The second brake control valve 113 has the same construction as the first brake control valve 13 so that corresponding parts are shown by the same reference numerals with addition of hundred. Thus, it will not be necessary to make further detailed descriptions on the second brake control valve 113. The third brake control valve 213 is also substantially identical in construction to the first brake control valve 13 and corresponding parts are shown by the same reference numerals as in the first brake control valve 13 with addition of two hundred. The outlet port 215a of the third brake control valve 213 is connected in this embodiment with a hydraulic pump 34 through a pressure line P' including a check valve 35 and a pressure accumulator 30. The pump 34 is driven by an electric motor 36 and draws hydraulic fluid from a reservoir 31. The return port 215c of the third brake control valve 213 is connected through a return line R' with the reservoir 31.

In the illustrated embodiment, the outlet chambers 16 and 116 in the valve housings 15 and 115 of the first and second brake control valves 13 and 113 are connected through outlet ports 15d and 115d respectively formed in the valve housings 15 and 115 with brake actuating cylinders 26a and 27a of brake mechanisms 26 and 27 which are respectively associated with a front left and a front right wheels of a vehicle on which the brake system is applied.

Similarly, the valve housing 215 of the third brake control valve 213 has an outlet port 215d which is communicating with the outlet chamber 216 and connected with brake actuating cylinders 32a and 33a of brake mechanisms 32 and 33 which are associated with rear wheels of the vehicle.

The left ends of the valve spools 14, 114 and 214 of the brake control valves 13, 113 and 213 extend outwardly beyond the associated valve housings 15, 115 and 215 and is in abutting engagement with a force divider plate 12. In a preferable arrangement, the valve spools 14, 114 and 214 engage the plate 12 at positions corresponding to apices of a regular triangle, and the plate 12 is provided with a recess 12a at the center of the triangle. A brake actuating rod 11 engaging at one end with a foot pedal 10 or other brake actuating member engages at the other end with the recess 12a in the plate. Thus, when the brake pedal 10 is actuated, the actuating force is transmitted through the rod 11 to the plate 12 and equally transmitted therefrom to the valve spools 14, 114 and 214 to displace them toward right by amounts corresponding to the force applied to the brake pedal 10. Thus, the pressure line P is connected through the inlet ports 15a and 15a, the annular grooves 14b and 114b; 15b and 115b and the passages 14e and 114e with the outlet chambers 16 and 116 in the first and second brake control valves 13 and 113 to actuate the brake actuating cylinders 26a and 27a of the front brake mechanisms 26 and 27. At the same time, the pressure line P' is connected through the inlet port 215a, the annular grooves 214b and 215b and the passage 214e with the outlet chamber 216 in the third brake control valve 213 to actuate the brake actuating cylinders 32a and 33a of the rear brake mechanisms 32 and 33.

The pressure prevailing in the outlet chambers 16, 116 and 216 applies reaction forces to the valve spools 14, 114 and 214 and the reaction forces are sensed by an operator depressing the brake pedal 10.

Hydraulic fluid flows are established from the pressure line P through the passages 15f and 15h having the restrictions 15e and 15g, the first and second control chambers 17 and 18 and the solenoid valve controlled nozzles 19 and 20 into the return line R. Thus, there is produced hydraulic pressure in each of the chambers 17 and 18 in accordance with the opening of the associated solenoid valve means 22 or 23. Similarly, hydraulic pressure is also produced in each of the control chambers 117, 118, 217 and 218 in the second and third brake control valves 113 and 213 in accordance with the opening of the associated solenoid valve.

Figure 2:
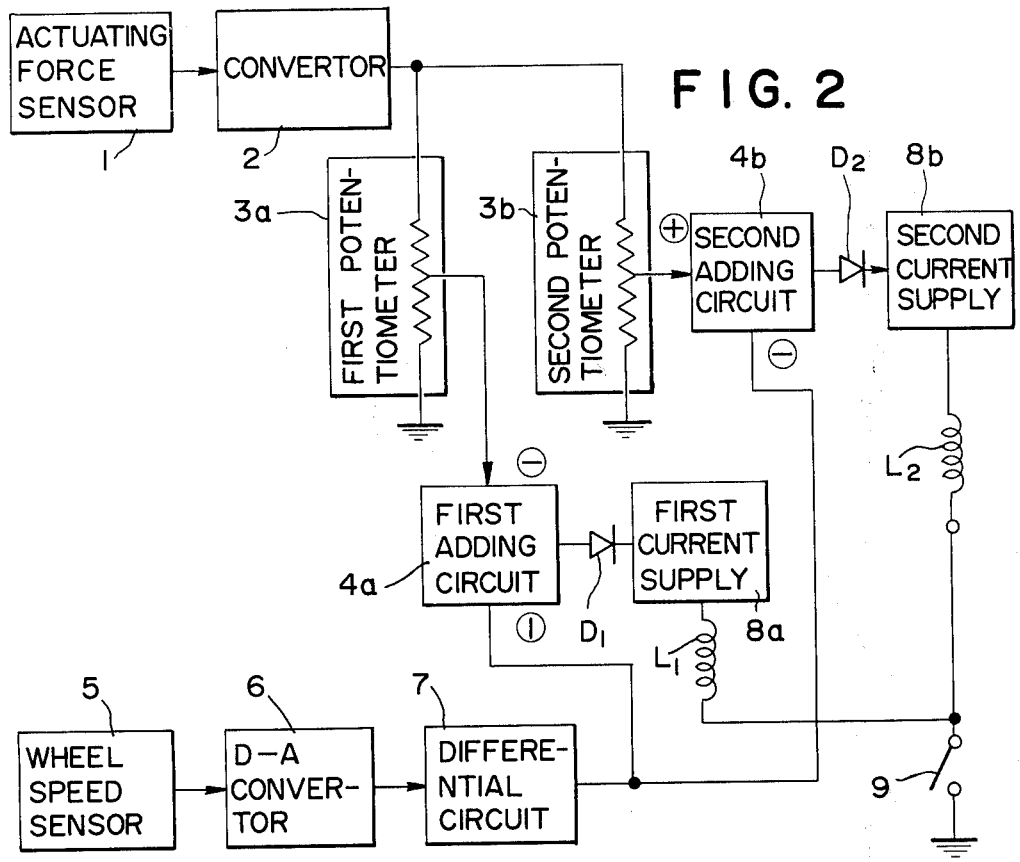
FIG. 2 is a block diagram of electrical control circuit employed in the brake control system shown in FIG. 1.
Figure 3:
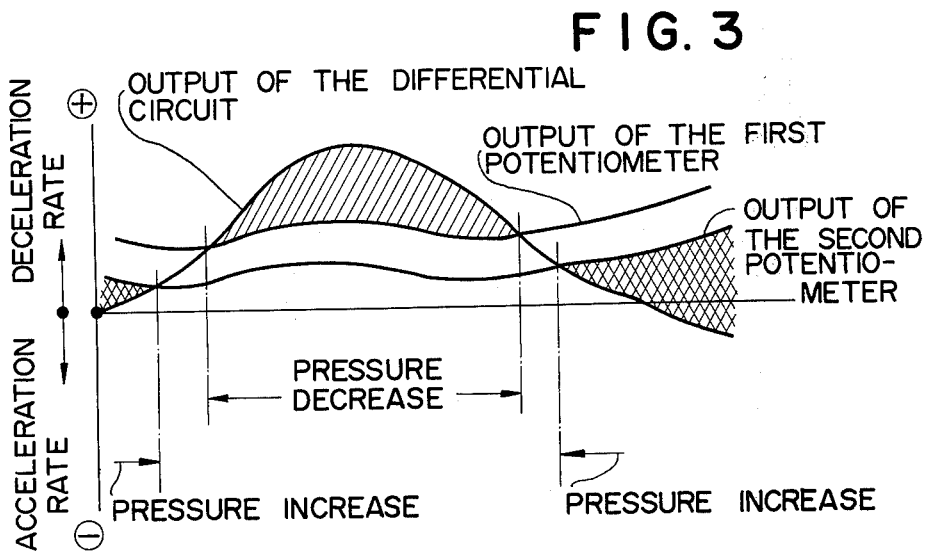
FIG. 3 is a diagram showing output characteristics of the brake control system.

Referring now to FIG. 2, there is shown an electrical control circuit for controlling the solenoid valve means for each of the brake control valves. The circuit includes a brake applying force sensor 1 for detecting the force applied to the brake pedal 10. The sensor 1 may be of such a type that detects the brake applying force by means of a strain gauge for measuring the strain of the brake pedal 10, the rod 11 or the plate 12. The output signal of the sensor 1 is transmitted to a transducer circuit 2 where the signal is converted into an electric signal having a voltage corresponding to the force applied to the brake pedal 10. The transducer circuit 2 is connected with a first potentiometer 3a and a second potentiometer 3b which are respectively connected with adding circuits 4a and 4b. The first adding circuit 4a is supplied with a negative signal and the second adding circuit 4b with a positive signal.

The control circuit further includes a wheel speed sensor 5 which produces a sine waved output signal having a frequency corresponding to the rotating speed of the wheel. In the arrangement shown in FIG. 1, the front wheels and a propeller shaft or a power transmission for driving the rear wheels may be provided with such wheel speed sensors 5. The output of the wheel speed sensor 5 is transmitted to a digital-analogue converting circuit 6 which is connected through a differential circuit 7 with the first and second adding circuits 4a and 4b. The digital-analogue converting circuit 6 produces an electrical signal having a voltage corresponding to the rotating speed of the wheel. This output signal of the converting circuit 6 is received by the differential circuit 7 which produces a signal having a voltage corresponding to the rate of deceleration or acceleration of the wheel. When the wheel speed is decreasing, the circuit 7 produces a positive signal but, when the wheel speed is increasing it produces a negative signal. During deceleration of the associated wheel, the first adding circuit 4a is supplied from the differential circuit 7 with a positive signal and the second adding circuit 4b with a negative signal.

Thus, the first adding circuit 4a is connected through a diode D1 with a first current supply circuit which supplies electric current to a solenoid coil L1 in accordance with the input voltage from the first adding circuit 4a. Similarly, the second adding circuit 4b is connected through a diode D2 with a second current supply circuit 8b which supplies electric current to a solenoid coil L2 in accordance with the input voltage from the second adding circuit 4b. The solenoid coils L1 and L2 are grounded through a brake switch 9 which may be closed when the brake pedal 10 is depressed.

The first adding circuit 4a receives a negative signal from the first potentiometer 3a and a positive signal from the differential circuit 7 and produces a differential signal. When the circuit 4a produces a positive output, it is transmitted through the diode D1 into the first current supply circuit 8a. Thus, electric current is supplied from the circuit 8a to the solenoid coil L1 in accordance with the level of the signal from the first adding circuit 4a. The solenoid coil L1 corresponds to either of the coils 23c, 123c and 223c in the brake control valves 13, 113 and 213 shown in FIG. 1.

Similarly, the second adding circuit 4b receives a positive signal from the second potentiometer 3a and a negative signal from the differential circuit 7 and produces a differential signal. When the circuit 4b produces a positive output, it is transmitted through the diode D2 into the second current supply circuit 8b whereby electric current is supplied from the circuit 8b to the solenoid coil L2 in accordance with the level of the signal from the second adding circuit 4b. The solenoid coil L2 corresponds to either of the coils 22c, 122c and 222c of the brake control valves 13, 113 and 213 shown in FIG. 1.

FIG. 1 shows the brake control system in the brake release position wherein the plungers 14, 114 and 214 in the brake control valves 13, 113 and 213 are in the extreme left positions and the solenoid valve means 22, 23; 122, 123; and 222, 223 are in the de-energized closed position. In operation, as the brake pedal 10 is depressed, the valve plungers 14, 114 and 214 are displaced toward right by the brake pedal 10 through the rod 11 and the plate 12. Thus, in the first brake control valve 13, the communication between the annular groove 15b and the return port 15c is interrupted and the inlet port 15a is connected through the annular grooves 14b and 15b with the passage 14e which is in communication with the outlet chamber 16. Therefore, hydraulic pressure is applied to the brake actuating cylinder 26a of the brake mechanism 26. As previously described, the pressure in the outlet chamber 16 applies a reaction force to the right end of the valve plunger 14 and the reaction force is transmitted through the plate 12 and the rod 11 to the brake pedal 10. Thus, it is possible to control the brake pressure in accordance with the force applied to the brake pedal 10.

Similarly, hydraulic pressure is also supplied through the second and third brake control valves 113 and 213 into the brake control cylinders 27a, 32a and 33a of the brake mechanisms 27, 32 and 33.

During the operation, for some reasons, for example due to bading of brake, if the rate of deceleration of one of the wheels, for example, the front left wheel is less than a lower limit which may be determined in accordance with the force applied to the brake pedal 10, the positive signal supplied from the second potentiometer 3b to the second adding circuit 4b exceeds the valve of the negative signal supplied thereto from the differential circuit 7 so that a positive output is produced in the second adding circuit 4b. The output signal of the second adding circuit 4b is transmitted through the diode D2 into the second current supply circuit 8b whereby electric current is supplied from the circuit 8b to the solenoid coil L2 which corresponds in this instance to the solenoid coil 22c of the solenoid valve means 22. On the other hand, the first adding circuit 4a produces a negative signal which is blocked by the diode D1. Thus, the solenoid coil L1 which corresponds in this instance to the solenoid coil 23c of the solenoid valve means 23 is maintained in de-energized condition.

Thus, the pressure in the first control chamber 17 is decreased to a value corresponding to the opening of the solenoid valve means 22 and the pressure difference between the first and second control chambers 17 and 18 increases the force biasing the valve spool 14 toward right. In this manner, the brake pressure supplied to the brake actuating cylinder 26a can be increased so as to attain a desired deceleration rate.

When the deceleration rate of the front left wheel exceeds an upper limit which may be determined in accordance with the depressing force applied to the brake pedal 10, the first adding circuit 4a produces a positive signal while the second adding circuit 4b produces a negative signal. Thus, the positive signal is transmitted from the first adding circuit 4b through the diode D1 to the first current supply circuit 8a. Therefore, electric current is supplied from the circuit 8a to the solenoid coil 23c of the solenoid valve means 23 in the first brake control valve 13. The solenoid valve means 23 is thus opened and the solenoid valve means 22 is maintained in the closed position, so that the pressure in the second control chamber 18 becomes lower than that in the first control chamber 17. The valve spool 14 of the first brake control valve 13 is then displaced toward left by the difference between the pressure in the first control chamber and that in the second control chamber, whereby the passage 14e in the valve spool 14 is connected through the annular groove 15b with the return port 15c resulting in a decrease in the pressure of the outlet chamber 16. Thus, the braking effort applied to the front left wheel is released or weakened to decrease the deceleration rate. The operation is continued until the deceleration rate of the front left wheel reaches a desired value which is determined in accordance with the force applied to the brake pedal 10.

When the deceleration rate of the front right wheel becomes lower than a lower limit or exceeds an upper limit which are determined in accordance with the depressing force applied to the brake pedal 10, the second brake control valve 113 and the electric control circuit associated therewith operates in a similar manner as described above with respect to the front left wheel, to increase or decrease the fluid pressure applied to the brake actuating cylinder 27a of the brake mechanism 27 until a desired deceleration rate is obtained.

Similarly, when the deceleration rate of the rear wheels is lower than the lower limit or exceeds the upper limit, the third brake control valve 213 and the electric control circuit associated therewith comes into operation in a similar manner as described above with respect to the front left wheel so as to attain a desired deceleration in accordance with the depressing force applied to the brake pedal 10.

In the brake system shown in FIG. 1, the third brake control valve 213 associated with the rear wheel brake mechanisms 32 and 33 has its own pressurized fluid supply source 34 which is independent from the hydraulic pump 28 for supplying pressurized fluid to the first and second brake control valves 13 and 113. Therefore, even when one of the hydraulic pumps 28 and 34 fails, the brake mechanisms associated with the other hydraulic pump can be operated without any problem.

Figure 4:
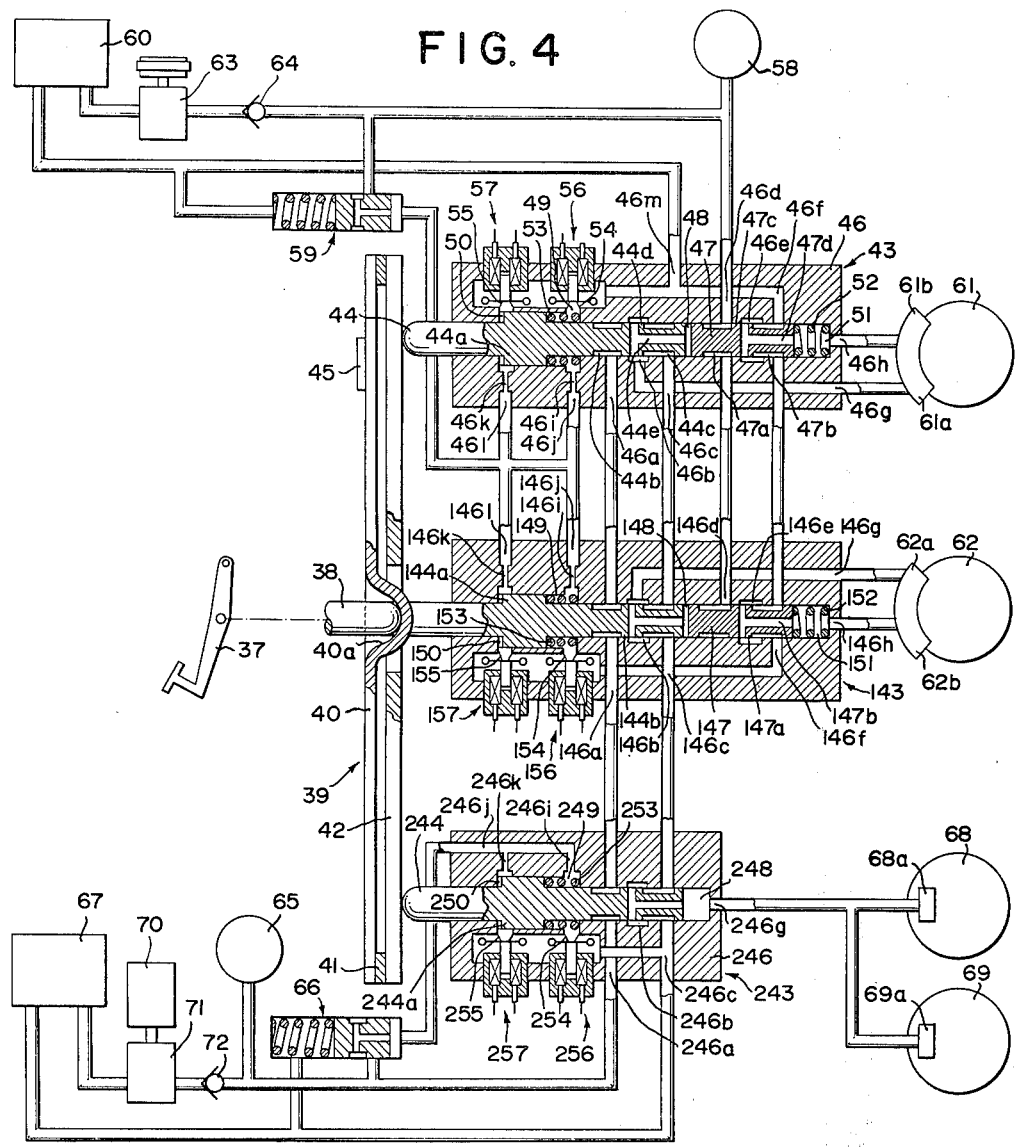
FIG. 4 is a view similar to FIG. 1 but showing another embodiment of the present invention.

Referring now to FIG. 4 which shows another embodiment of the present invention, the brake control system shown therein includes a first brake control valve 43 which comprises a valve housing having an axial bore and a valve spool 44 slidably received in the axial bore of the valve housing. The valve spool 44 has a left end extending outwardly beyond the valve housing 46 and a right end terminating in the axial bore of the valve housing 46. A further valve spool 47 is also disposed end-to-end relationship with the valve spool 44 in the axial bore of the valve housing 46 so that a first outlet chamber 48 is defined in the axial bore between the valve spools 44 and 47. A second outlet chamber 51 is defined in the axial bore of the valve housing 46 by the right hand end of the valve spool 47. The axial bore of the valve housing 46 has an enlarged portion at the left end thereof and the valve spool 44 is provided with a land 44a which is slidably received in the enlarged portion of the axial bore. A first control chamber 49 is defined in the axial bore at the right side of the land 44a and a second control chamber 50 is defined at the left side of the land 44a.

The valve housing 46 is provided at the axial bore with a first inlet port 46a and at the right side thereof there are also provided two axially spaced annular grooves 46b and 46e, and a first return port 46c and a second inlet port 46d which are disposed between the annular grooves 46b and 46e. A second return port 46f is also provided at the right side of the annular groove 46e and the valve housing 46 is further provided with an outlet port 46h communicating with the second outlet chamber 51. The valve spool 44 is provided with two axially spaced annular grooves 44b and 44c which define a land 44d therebetween. A passage 44e is formed in the valve spool 44 and opens on one hand at the periphery of the land 44d and on the other hand at the right end of the spool 44. The land 44d is so located that it co-operates with the annular groove 46b of the valve housing 46 for selectively connecting the passage 44e in the spool 44 either with the annular groove 44b or the annular groove 44c in response to the rightward or leftward displacement of the valve spool 44. The annular groove 44b is in communication with the first inlet port 46a and the annular groove 44c is in communication with the first return port 46c.

The valve spool 47 is provided with two axially spaced annular grooves 47a and 47b to define a land 47c therebetween. A passage 47d is provided in the spool and has one end opening to the periphery of the land 47c and the other end opening to the right end of the spool 47. The land 47c of the valve spool 47 is so positioned that it co-operates with the annular groove 46e of the valve housing 46 to selectively connect the passage 47d in the spool 47 either with the annular groove 47a or the annular groove 47b in response to the rightward or leftward movement of the spool 47.

The annular groove 47a is always in communication with the second inlet port 46d and the annular groove 47b is always in communication with the second return port 46f.

The second inlet port 46d is connected with a pressure accumulator 58 and also through a check valve 64 with a hydraulic pump 63 which draws hydraulic fluid from a reservoir 60. The second return port 46f is connected with a return line 46m which leads to the reservoir 60.

The first control chamber 49 is connected on one hand with the pressure supply line through a pressure reducing valve 59 and a line 46j having a restriction 46i and on the other hand with the return line 46m through a nozzle 54 which is controlled by a solenoid valve means 56. The second control chamber 50 is also connected with the pressure supply line through a line 46l having a restriction 46k and also with the return line 46m through a nozzle 55 which is controlled by a solenoid valve means 57. The solenoid valve means 56 and 57 are identical in construction to the solenoid valve means 22 and 23 employed in the embodiment of FIG. 1 so that their details will not be described. In the first control chamber 49, there is disposed a spring 53 for biasing the valve spool 44 toward left. A spring 52 is disposed in the second outlet chamber 51 for biasing the valve spool 47 toward left.

The brake control system further includes a second brake control valve 143 which is substantially identical to the first brake control valve 43. Corresponding parts in the second brake control valve 143 are therefore shown by the same reference numerals as in the first brake control valve 43 with addition of one hundred.

There is also provided a third brake control valve 243 which is similar to the first brake control valve 43 except that the valve spool 47, the second inlet port 46d, the annular groove 46e, the second return port 465 and the spring 52 are omitted, and the passage 46j. Therefore, its structures will not be described in detail and corresponding parts are shown by the same reference numerals with addition of two hundred.

A hydraulic pump 71 which is driven by an electric motor 70 draws hydraulic fluid from a reservoir 67 and supplies pressurized fluid through a check valve 72 to a pressure supplyline having an accumulator 65. The pressure line is connected with the first inlet ports 46a, 146a and 246a of the valves 43, 143 and 243. The pressure line is also connected through a pressure reducing valve 66 and passages 246j and 246k with the first and second control chambers 249 and 250, respectively. The passages 146j and 146l leading to the first and second control chambers 149 and 150 are supplied with pressurized fluid from the hydraulic pump 63 through the check valve 64 and the pressure reducing valve 59. The first return ports 46c, 146c and 246c of the first, second and third control valves 43, 143 and 243 are connected through a return line with the reservoir 67. The second inlet port 146d and the second return port 146f of the second brake control valve 143 are respectively connected with the corresponding ports in the first brake control valve 43.

The left ends of the valve spools 44, 144 and 244 extending outwardly beyond the associated valve housings are in abutting engagement with a rigid plate 42 of a brake control valve actuating plate assembly 39. A leaf spring 40 is attached to the rigid plate 42 with a peripheral spacer 41. The leaf spring 40 is provided at its center with a recess 40a with which a push rod 38 engages. The push rod 38 is actuated by a brake actuating member such as a brake pedal 37 as in the previous embodiment. A strain gauge 45 is attached to the leaf spring 40.

The annular groove 46b in the valve housing 46 is connected through a first outlet line 46g with a first brake actuating cylinder 61a of a brake mechanism 61 for a front left wheel and the outlet port 46h is connected with a second brake actuating cylinder 61b of the brake mechanism 61.

Similarly, the annular groove 146b in the valve housing 146 of the second brake control valve 143 is connected through a first outlet line 146g with a first brake actuating cylinder 62a of a brake mechanism 62 for a front right wheel and the outlet port 146h is connected with a second brake actuating cylinder 62b of the brake mechanism 62. The outlet port 246g of the third brake control valve 243 is connected with brake actuating cylinders 68a and 69a of brake mechanisms for rear wheels.

In FIG. 4, parts are shown in brake release position. From this position, when the brake actuating pedal 37 is depressed, the valve, spools 44, 144 and 244 are shifted toward right. Thus, in the first brake control valve 43, the valve spool 47 is also shifted toward right together with the valve spool 44. Similarly, in the second brake control valve 143, the valve spool 147 is shifted toward right together with the valve spool 144.

In the first brake control valve 43, due to the rightward movement of the valve spools 44 and 47, the first inlet port 46a is brought into communication with the annular groove 46b and the second inlet port 46d is connected with the annular groove 46e. In the second brake control valve 143, the first inlet port 146a is similarly connected with the annular groove 146b and the second inlet port 146d with the annular groove 146e. In the third brake control valve 243, the inlet port 246a is connected with the annular groove 246b. Thus, the first brake actuating cylinders 61a and 62a of the brake mechanisms 61 and 62 of the front left and right wheels and the brake actuating cylinders 68a and 69a of the brake mechanisms 68 and 69 for the rear wheels are supplied with hydraulic fluid under pressure from the hydraulic pump 71 and the accumulator 65. Further, the second brake actuating cylinders 61b and 62b of the brake mechanisms 61 and 62 for the front left and right wheels are supplied with pressurized hydraulic fluid from the hydraulic pump 63 and the accumulator 58. The brake actuating pressure in the first brake cylinder 61a is also transmitted through the passage 44e in the valve spool 44 into the chamber 48 to apply a reaction force to the valve spool 44 for balancing the force applied to the spool 44 from the brake pedal 37. Therefore, a pressure is established in the chamber 48 and therefore in the first brake actuating cylinder 61a in accordance with the force applied to the brake actuating pedal 37. The pressure in the chamber 48 also acts to force the valve spool 47 toward right and this pressure is balanced by the pressure prevailing in the outlet chamber 51 and thus in the second brake actuating cylinder 61b. Thus, the pressure applied to the second brake actuating cylinder 61b corresponds to that in the first brake actuating cylinder 61a.

Similarly, the first and second brake actuating cylinders 62a and 62b are supplied with hydraulic pressure which is determined at the second brake control valve 143 in accordance with the depressing force applied to the brake actuating pedal 37. The brake actuating cylinders 68a and 69a are also supplied with hydraulic pressure which is determined at the third brake control valve 243 in accordance with the depressing force applied to the brake actuating pedal 37.

During the operation, when it is sensed that the deceleration rate of the left front wheel is less than the lower limit which is determined in accordance with the depressing force on the brake pedal 37, the solenoid valve means 56 is energized to open. Thus, the pressure in the first control chamber 49 is decreased in accordance with the amount of opening of the solenoid valve 56 and the pressure difference between the chambers 49 and 50 urges the valve spool toward right to increase the pressure applied to the brake actuating cylinders 61a and 61b until a desired deceleration rate is attained.

When it is sensed that the deceleration rate is greater than the upper limit determined in accordance with the depressing force on the brake pedal 37, the solenoid valve means 57 is energized to open. Thus, the pressure in the second control chamber 50 is decreased in accordance with the amount of opening of the solenoid valve 57. The pressure difference thus produced between the first and second control chambers 49 and 50 urges the valve spool 44 toward left, whereby the pressure supplied to the first and second brake actuating cylinders 61a and 61b is released or decreased to decrease the deceleration rate of the front left wheel to a desired value.

The deceleration rate of the front right wheel and the rear wheels can be controlled in a similar manner by selectively energizing the solenoid valve means 156, 157, 256, and 257 in the second and third brake control valves 143 and 243.

In the embodiment shown in FIG. 4, the brake mechanisms 61 and 62 for the front wheels are actuated by two independent hydraulic pressure sources 63 and 71. Therefore, even when the hydraulic pump 63 fails, the brake actuating cylinders 61a, 62a, 68a and 69a can be operated without any problem. Further, when the pump 71 fails, it is possible to obtain braking operation by the brake actuating cylinders 61b and 62b. The brake actuating cylinders 61b and 62b may be designed to provide greater braking effort than the cylinders 61a and 62a so that they can provide sufficient braking force during failure of the pump 71.

It is of course possible to provide two independent brake actuating cylinders for each of the rear wheels. The pressure reducing valves 59 and 66 of a known type that produces a constant pressure irrespective of change in the output pressure of the associated pump. It should further be noted that the embodiments are described that the brake control valves are actuated manually through a mechanical means such as a brake control pedal but the valves may be electrically actuated to provide an automatic brake system. It is also within the scope of the present invention to omit the solenoid valve means associated with the first control chamber of each valve. In such an instance, the system can operate in such a mode in that excessive brake pressure can be released or decreased to avoid wheel locking or skidding.

The invention has thus been shown and described with reference to preferred embodiments, however, it should be noted that the invention is in no way limited to the details of the illustrated embodiments but changes and modifications may be made without departing from the scope of the appended claims.

I claim:

1. Brake control system including a fluid reservoir, hydraulic pressure source means, brake control valve means, means for actuating said brake control valve means, and brake means including at least one brake actuating means connected with said brake control valve means, said brake control valve means including at least one brake pressure control valve comprising a valve housing having an axial bore provided with an inlet port for connection with said hydraulic pressure source means, an outlet port for connection with said brake actuating means and a return port for connection with said fluid reservoir, a valve spool slidably disposed in said axial bore of said valve housing, said valve spool having land means defining within said valve housing a first control chamber at one side of said land means and a second control chamber at the other side, means provided in said valve spool for connecting said inlet port with said outlet port when said valve spool is slidably displaced toward a first direction in said axial bore of said valve housing, means provided in said valve spool for connecting said outlet port with said return port when said valve spool is slidably displaced toward a second direction in said axial bore of said valve housing, said outlet port being so disposed that pressure therein serves to bias said valve spool toward the second direction, said first and second control chambers being so disposed that pressure in said first chamber biases said valve spool toward the second direction while pressure in said second chamber biases said valve spool toward the first direction, first and second restricted passages connecting, through said first and second chambers respectively, said hydraulic pressure source means to said fluid reservoir, means provided in at least one of said first and second restricted passages for regulating pressure in said first and second chambers, and means for actuating said regulating pressure means upon detection of braking force conditions which exceed or are below certain predetermined levels, and wherein said means for actuating said brake control valve means includes means for actuating said valve spool toward the first direction.

2. The brake control system in accordance with claim 1 in which said pressure regulating means includes first and second outlet nozzles provided respectively in said first and second restricted passages, and first and second solenoid valve means for controlling, respectively, said first and second outlet nozzles, and in which said means for actuating said pressure regulating means includes electrical means for energizing said first solenoid valve means upon detection of braking force conditions exceeding a predetermined level and said second solenoid valve means upon detection of braking force conditions below a predetermined level.

3. The brake control system in accordance with claim 1 in which said brake control valve means includes three brake pressure control valves, and said hydraulic pressure source means includes two independent hydraulic pumps, one pump being operatively connected to two of said brake pressure control valves and the other pump being operatively connected to the remaining one of said brake pressure control valves.

4. Brake system in accordance with claim 1 in which said valve housing of said brake pressure control valve has a second pressure inlet port, a second return port and a second outlet port, and said brake pressure control valve further includes a second valve spool slidably disposed in said axial bore in end-to-end relationship with the first valve spool and having means for connecting said second inlet port with said second outlet port when said second valve spool is slidably displaced toward the first direction in said axial bore of said valve housing and means for connecting said second outlet port with said second return port when said second valve spool is slidably displaced toward the second direction in said axial bore of said valve housing.

5. The brake control system in accordance with claim 4 in which said brake means includes first and second independent brake actuating means, said hydraulic pressure source means includes first and second independent hydraulic pumps, and said brake control valve means includes two brake pressure control valves, said first and second inlet ports in each of said brake pressure control valves being connected independently with said first and second hydraulic pumps, respectively, and said first and second outlet ports being connected independently with said first and second brake actuating means, respectively.

* * * * *